July 9, 1957   D. D. GRIMES   2,798,430
ROCKET GRAIN BRAKING APPARATUS
Filed June 1, 1953   4 Sheets-Sheet 3

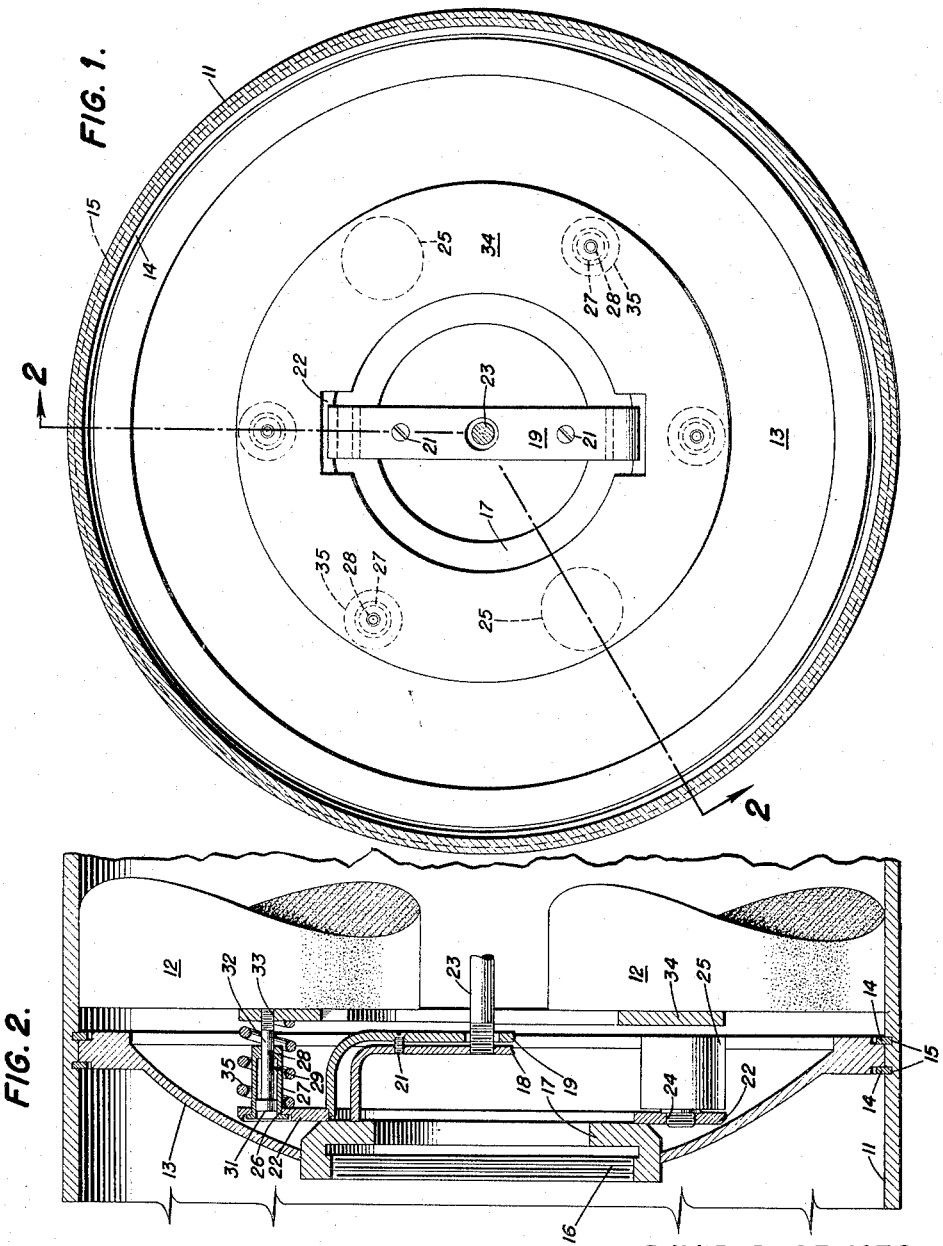

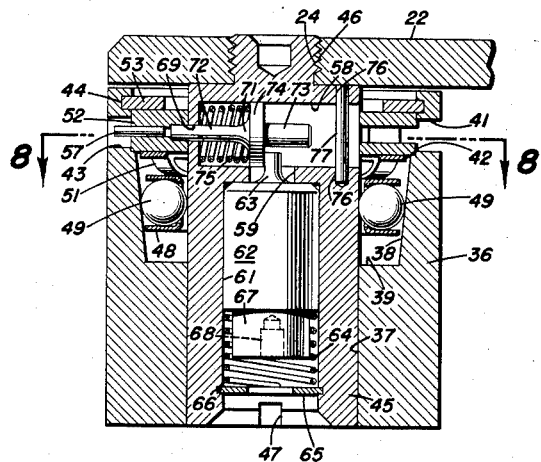
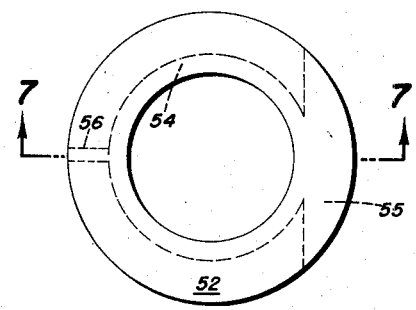
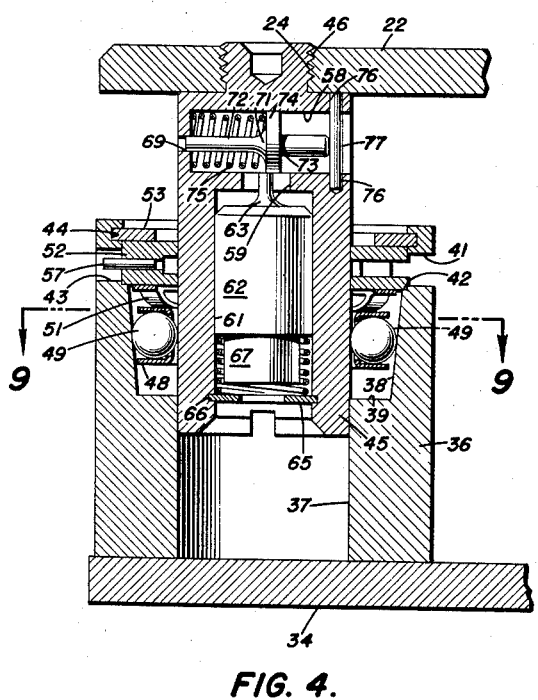

DAVID D. GRIMES
INVENTOR.

July 9, 1957
D. D. GRIMES
2,798,430
ROCKET GRAIN BRAKING APPARATUS
Filed June 1, 1953
4 Sheets-Sheet 4
FIG. 10.
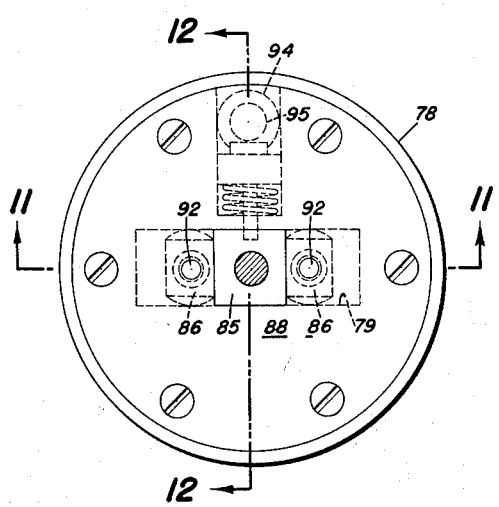
FIG. 12.
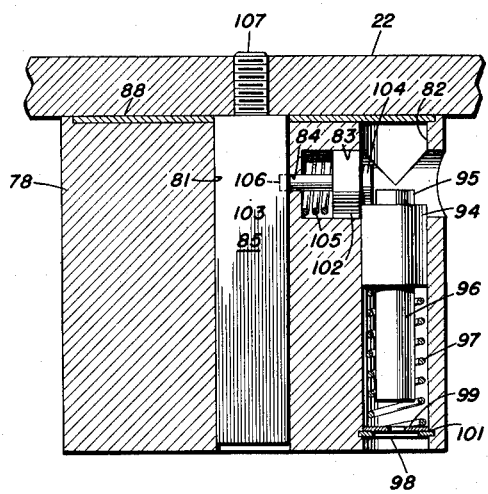
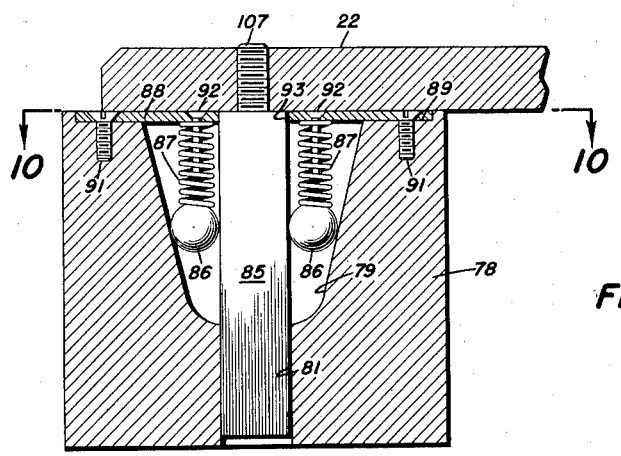
FIG. 11.
DAVID D. GRIMES
INVENTOR.
BY
ATTORNEYS United States Patent Office 2,798,430
Patented July 9, 1957

2,798,430

ROCKET GRAIN BRAKING APPARATUS

David D. Grimes, Silver Spring, Md., assignor to the United States of America as represented by the Secretary of the Navy Application June 1, 1953, Serial No. 358,928

15 Claims. (Cl. 102—49)

This invention relates generally to aerial vehicles. More particularly it relates to an improved braking apparatus for preventing displacement of and possible injury to the propellent grains of a sustainer rocket of a missile during flight thereof.

Some flight failures of rocket powered missiles have been traced to violent collisions of propellent grains of the sustainer rockets with the rear walls of the rocket casings containing said grains. This condition has been found to arise during that portion of missile flight between booster burn-out and sustainer ignition. During the first part of this period, drag forces cause a missile to decelerate at a rate which is frequently of the order of five or six times the acceleration due to gravity. Under the influence of inertia the propellent grains tend to slide forward in the casing, and if permitted to separate from the rear wall of said casing, they would subsequently collide therewith when the commencement of sustainer burning imparts acceleration to the missile. Such collision occurs with sufficient force to rupture the grains or damage the casing.

One of the principal objects of the present invention, therefore, is to provide a braking apparatus which will eliminate any such destructive effects caused by inertia by retaining the propellent grains of a rocket powered missile firmly seated upon the rear wall of the missile casing at all times during flight.

A further object of the invention is to provide a braking apparatus for use in a rocket to retain the propellent grains of the rocket seated in their aftmost positions during rocket flight, thus preventing shifting of said propellent grains and consequent damage to the rocket casing.

It is a further object of the invention to provide a braking apparatus having the foregoing features, and which will become operative only under inertial influences as by the launching of the rocket, but at all times prior to launching will remain inoperative to permit thermal expansion of the propellent grains.

Other objects and advantages of the invention will become evident from the following detailed description, taken in conjunction with the accompanying drawings, in which:

Fig. 1 is a transverse section through the sustainer casing of a rocket showing the braking apparatus and the preferred locations of braking units embodying the present invention, with respect to said casing;

Fig. 2 is a fragmentary axial section, on line 2—2 of Fig. 1;

Fig. 3 is a sectional view of a brake unit, showing a set-back arming mechanism used for holding said brake unit out of operation;

Fig. 4 is a sectional view similar to Fig. 3, but showing the set-back arming mechanism in condition for permitting free operation of the brake unit;

Fig. 5 is a detail perspective view of the housing of the brake unit shown in Figs. 3 and 4;

Fig. 6 is a plan view of an element of the brake unit;

Fig. 7 is a sectional view on the line 7—7 of Fig. 6;

Fig. 10 is a view in section of a modified form of the braking unit, as seen in the plane of line 10—10 of Fig. 11;

Fig. 11 is a view in section along line 11—11 of Fig. 10; and

Fig. 12 is a sectional view on the line 12—12 of Fig. 10, showing a set-back arming mechanism employed in the modified braking unit.

Figure 8:
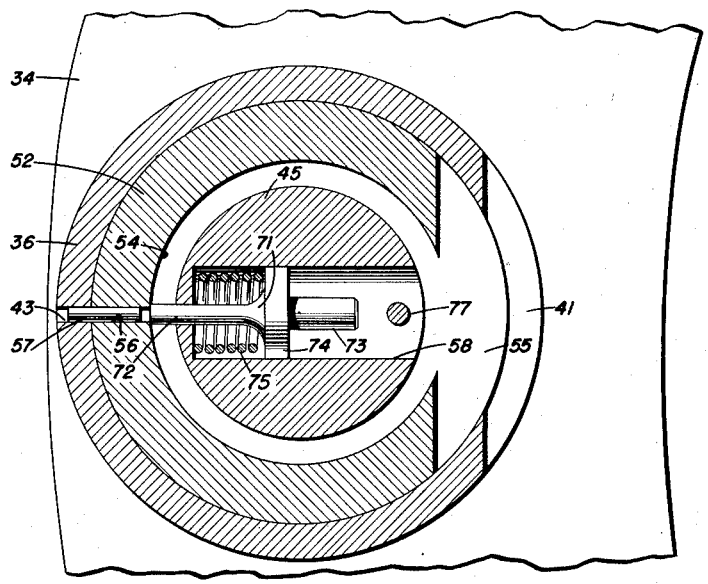
Fig. 8 is an enlarged view in section along line 8—8 of Fig. 3.

This invention generally contemplates a braking apparatus particularly designed to control the movement of propellent grains in a sustainer rocket casing of a missile under certain flight conditions. The apparatus employs a plurality of braking units arranged about the casing axis in positions confronting the forward end portions of the propellent grains.

Each braking unit comprises a pair of elements mounted so as to permit relative movement in one direction but to prevent such movement in the opposite direction. The principle of operation of the braking unit is based upon the wedging action of balls or rollers in a tapered space between the two members, the relative movements of which are restricted to those only in a parallel direction.

When applied to immobilizing the propellent grains of a rocket powered missile, one element of the braking unit is secured to the forward end of the rocket casing and the other bears upon a pressure plate which in turn is caused by spring means to bear upon the propellent grains. The arrangement is such that the forward movement of the pressure plate is restrained but rearward movement is not. Thus, forward shifting of the grains is prevented and the pressure plate is in constant engagement therewith.

A set-back arming mechanism, as is commonly used in fuze arming, may be employed to retain the braking units inoperative prior to launching of the missile. In their inoperative condition the braking units are maintained out of contact with the pressure plate, thus allowing for thermal expansion of the grains. The inertial influence experienced during launching releases the arming mechanism which in turn releases the braking units for operation. The braking apparatus, under the influence of inertia, makes and retains contact with the pressure plate and thus, the propellent grains to prevent the shifting of said grains even under extreme conditions of deceleration.

Referring now to the drawings and in particular to Figs. 1 and 2, there is shown a portion of a sustainer rocket casing 11 containing propellent grains 12 and a forward end portion 13 which is held in place in said casing by retaining rings 14 engaging in peripheral grooves 15 in the inner wall of the casing. The forward end portion 13 is fitted with an axially mounted coupling sleeve 16 having an inwardly directed flange 17. Inner and outer U-shaped brackets 18 and 19, the inner straddling the outer, are held in close spaced relation by screws 21; the ends of the inner bracket are welded to the flange 17, while the ends of the outer bracket are suitably secured to, and thus support, an annular plate 22 constituting a part of the braking apparatus to be described in detail hereinafter. The inner bracket 18 supports a resonance rod 23 which passes freely through the bracket 19 and axially through the casing 11 between the propellent grains 12 and terminates at the rear of said casing. Such rods are commonly employed in rockets to prevent the break-up of the propellent grains during burning. This casing construction permits the accommodation of an igniting mechanism (not shown) which forms no part of the present invention.

The braking apparatus includes the annular plate 22 which is provided with two diametrically opposed threaded holes 24 to mount two braking units 25 which will be fully described hereinafter. Four recessed holes 26 symmetrically formed in the annular plate 22 each receive a flanged sleeve 27 having an end wall with a coaxial hole 28 formed therein. A bolt 29 having a head 31 and a shank 32 is contained within each sleeve 27, with said shank passing through the hole 28 in the end wall of the sleeve. The end portions of the shanks 32 are threaded and engage similarly threaded apertures 33 in an annular pressure plate 34, providing support therefor. A coil spring 35 is positioned about each of the four sleeves 27 between the annular plate 22 and the pressure plate 34 to urge said pressure plate into engagement with the propellent grains 12.

A typical braking unit is shown in detail in Figs. 3 and 4, and includes a cylindrical housing 36 having a cylindrical passage 37 extending coaxially therethrough. The housing 36 is formed at one end with an axial recess 38 of circular cross-section tapering inwardly to define a shoulder 39. A chordal slot 41 is milled through the side wall of the housing 36 in the region of the axial recess 38, and an annular seat 42 is formed in the inner wall of the housing immediately below the base of said slot. Diametrically opposite the chordal slot 41 is an opening 43 through the side wall of the housing 36. An annular groove 44 is provided on the inside wall of housing 36 near the mouth of the recess 38. The purpose of the opening 43 and the groove 44 will appear hereinafter.

An inner member comprising a cylindrical sleeve 45 to be described in detail hereinafter, is slidably mounted in the passage 37 and is adapted to be fixed to the annular plate 22. That is, the upper end of the sleeve 45 is formed with a threaded hub 46 and the lower end with a transverse groove 47. When installing a braking unit a screwdriver or similar tool is inserted into the groove 47 and the threaded hub 46 is screwed into the threaded hole 24 provided in the annular plate 22.

Figure 9:
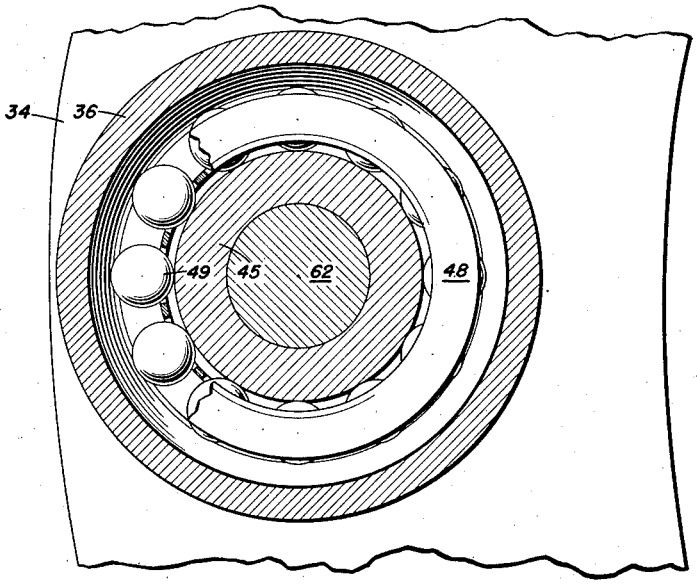
Fig. 9 is an enlarged sectional view along line 9—9 of Fig. 4.

Within the recess 38 is contained a circular ball race 48 shown in partial cutaway in Fig. 9, carrying a plurality of ball bearings 49 in annular series and which encircles the sleeve 45 in such a manner that the ball bearings 49 are caused to ride upon the outer surface of said sleeve. Above the race 48 is mounted a spring washer 51 which bears upon said race to urge it into the recess 38. A locking washer 52 to be further described hereinafter is supported on the annular seat 42 to retain the spring washer 51 and the ball race 48 within the recess 38, and the entire assembly is held in place by a retaining ring 53 engaging the annular groove 44.

As best seen in Figs. 6, 7 and 8, the locking washer 52 has an annular groove 54 around the inner periphery thereof for cooperation with a detent of a set back arming mechanism, to be described later, to lock the housing 36 to the sleeve 45. A chordal slot 55 is milled through the wall of the washer 52 and an opening 56 is drilled through the side wall of said washer diametrically opposite of said chordal slot. The washer 52 is positioned in the recess 38 so that the chordal slots 41 and 55 and the openings 43 and 56 are in registry. A pin 57 is fitted in the two said openings to hold the washer 52 from rotation relative to the housing 36.

The cylindrical sleeve 45 is formed with a blind lateral bore 58 which is connected by a port 59 to a longitudinal bore 61 coaxially formed in said sleeve. Slidably mounted within the longitudinal bore 61 is a bolt 62 having an axially mounted detent 63 on its inner end, said detent normally extending through the port 59 into the bore 58. A coil spring 64 is mounted in the lower end of the bore 61 and is held in place by a retaining ring 65 which is fitted in an annular groove 66 in the inner wall of said bore. The bolt 62 is further formed with a reduced lower end portion 67 which guides the upper end of the spring 64. An axially located, threaded hole 68 is provided in the reduced portion for use in resetting the arming device, as will be described in more detail hereinafter.

At the blind end of the lateral bore 58 there is provided an opening 69 drilled through the sleeve 45 and coaxial with said bore. A bolt 71 having an axially formed stem 72, a reduced portion 73 and an intermediate portion 74, is slidably mounted within the lateral bore 58, with said stem extending through the opening 69. A coil spring 75 is mounted in the lateral bore 58 between the closed end wall thereof and the intermediate portion 74 of the bolt 71 for urging said bolt toward a retracted position. Two alined openings 76, opening into lateral bore 58 near its open end, are provided in the sleeve 45, parallel to the longitudinal axis of said sleeve, and a limit pin 77 extends diametrically of said bore and has its end portions fitted in said openings.

During the period of time between the installation of the braking apparatus in a missile and the launching of said missile, it is desirable to permit the free thermal expansion of the propellent grains 12. To bring this about, the braking apparatus must be maintained inoperative, and a set back arming mechanism, including the bolts 62 and 71, is employed for the purpose.

The set back arming mechanism functions as follows. Prior to launching, the stem 72 of the bolt 71, as best shown in Fig. 8, is held in a position extending through the opening 69, by the detent 63, and engages the groove 54 of the locking washer 52, thus preventing the downward movement of the housing 36 relative to the sleeve 45. In this manner the housing 36 is held out of contact with the pressure plate 34 which bears upon the propellent grains 12, and space is thus provided in which the grains may expand.

During launching, inertial effects, produced by acceleration of the missile, cause the bolt 62 to slide downwardly (as shown in Figs. 3 and 4) against the compression of the coil spring 64. The detent 63 is thus disengaged from the outward face of the intermediate portion 74 of the bolt 71 to release said bolt for retracting movement under the influence of coil spring 75, said retracting movement continuing until the end of the portion 73 of said bolt engages the limit pin 77. The end of the stem 72 is now disengaged from the groove 54 of locking washer 52 and the housing 36 is free to move in a downward direction to come into contact with the pressure plate 34. The same inertial effects that release the set back arming mechanism cause the housing 36 to move downwardly along the sleeve 45 until contact is made with the pressure plate 34. It can be seen that such downward movement of the housing 36 releases whatever frictional restraints are exerted by the ball bearings 49 upon the wall of the tapered recess 38 and the surface of the sleeve 45, so that free movement of said housing will be permitted.

After the housing 36 has moved to operative position in engagement with the pressure plate 34, the grains 12 will be held against forward longitudinal movement in the sustainer rocket casing 11. Any tendency of the grains to move in a forward direction toward the end portion 13 will be arrested by said pressure plate 34 in cooperation with the braking units 25. That is, a tendency of the plate 34 to move forwardly in response to pressure from the grains 12 will be arrested by action of the balls 49 which are jammed against the outer walls of the sleeves 45 by the tapered walls of the recesses 38, for locking said sleeves to their respective housings 36. It thus will be seen that the grains 12 will be protected from damage as a result of large deceleration forces brought about as a result of booster rocket burn-out.

It is desirable to test the arming mechanism of each braking unit prior to its installation in a missile by subjecting the unit to inertial set-back forces tending to release the bolts 62 and 71. To reset the arming mechanism subsequent to testing, the sleeve 45 is reinserted into the housing 36 so that the stem 72 of the bolt 71 is in registry with the groove 54 of the locking washer 52. A threaded tool is then screwed into the tapped hole 68 in the lower end of the bolt 62 and the detent 63 of said bolt is withdrawn and held from engagement with the bolt 71 within the lateral bore 58. A suitable slender tool is inserted through chordal grooves 41 and 55 of the housing 36 and the locking washer 52, respectively, passed on either side of the limit pin 77 and impressed upon the intermediate portion 74 of the bolt 71 to push said bolt outwardly against the bias of the coil spring 75. When the stem 72 engages the groove 54, the bolt 62 is permitted to move upward under the influence of the coil spring 64 until the detent 63 engages behind the intermediate portion 74, whereupon the resetting tools are removed and the device is ready for installation.

Referring to Figs. 10, 11 and 12, a modified form of the invention now will be described. A cylindrical housing 78 is formed at its upper end with an inwardly tapering coaxial recess 79 of rectangular cross-section. A square passage 81, extends from the center of the bottom of the recess through the housing.

A longitudinal bore 82 passes completely through the housing 78 at one side of the recess 79, and a blind lateral bore 83 is formed in said housing perpendicular to the axis of and intersecting the bore 82. At the inner end of said lateral bore 83 is an opening 84 which communicates with recess 79, said opening being in alinement with the axis of said lateral bore. Contained within the bores 82 and 83 is the set back arming mechanism the construction of which will be described hereinafter.

An inner member comprising a square rod 85 is mounted for sliding movement in the passage 81 of the housing 78. Within the recess 79 and on each side of the rod 85 are disposed rollers 86 which are urged into said recess by coil springs 87 mounted above each of said rollers. A circular plate 88, is fitted into a shallow circular recess 89 in the upper end of the housing 78 and is secured by screws 91. Two pins 92 are mounted on the under side of the plate 88 and extend into the recess 79 coaxial with the coil springs 87, and serve to retain said springs in operative positions with respect to the rollers 86. The plate 88 closes the upper ends of the longitudinal bore 82 and the recess 79, and is formed with a rectangular central opening 93 receiving the rod 85 therethrough.

A bolt 94 is mounted for sliding movement in the bore 82. As best seen in Fig. 12, the bolt 94 has a reduced upper end portion defining a stop 95, and is provided with a reduced, elongated shank 96. A coil spring 97 is positioned in the bore 82 about the shank 96 and is held against displacement from said bore by a retaining ring 98 and a washer 99, said ring being fitted into a groove 101. The spring 97 urges the bolt 94 upwardly in the bore and the washer 99 provides a stop for limiting downward travel of said bolt. Mounted for sliding movement in the bore 83 is a detent element 102 having an axially disposed pin 103 on its inner end, said pin projecting through the opening 84. The detent element 102 is further formed with a reduced portion defining a stop 104 on its outer end. A coil spring 105 is disposed about the pin 103 in the bore 83 and urges the detent element outwardly and into engagement with the stop 95 of the bolt 94.

The rod 85 is formed with a recess 106 near the upper end of the lateral wall confronting the opening 84, to receive the pin 103 for retaining said rod and the housing 78 in locked relation. As best seen in Figs. 11 and 12, the rod 85 is formed at its upper end with a reduced, threaded shank 107 which is screwed into the plate 22.

In operation, the modified form of the invention shown in Figs. 10, 11 and 12 functions as follows. When installed in a missile and prior to launching, the housing 78 is locked to the rod 85 by the engagement of the pin 103 in the recess 106. Under the influence of the coil spring 105, the bolt 102 tends to slide outwardly of the lateral bore 83 to disengage the pin 103 from the recess 106. However, the outward movement of the bolt 102 is obstructed by the stop 95 of the bolt 94 which projects, by the action of the coil spring 97, into the lateral bore 83 and into engagement with the detent element 102 and the stop 104. The pin 103 is thus retained firmly in engagement in the recess 106. The stop 104 on the bolt 102 limits further upward movement of the bolt 94 in the bore 82.

The inertial forces incurred during launching cause the bolt 94 to slide downwardly until the washer 99 is engaged, whereupon further downward sliding is prevented. The bolt 102 in the lateral bore 83 then moves outwardly by the action of the coil spring 105, to withdraw the pin 103 from the recess 106. Complete ejection of the bolt 102 from the lateral bore 83 is prevented by the stop 95 of the bolt 94 which obstructs said lateral bore. The consequent disengagement of the pin 103 from the recess 106 permits the housing 78 to slide rearwardly, under set back, along the rod 85. The rearward movement of the housing 78 stops when contact is made with the pressure plate 34 (Figs. 2 and 4) which bears upon the propellent grains 12.

Forward motion of the housing 78, induced by inertial forces arising when the missile rapidly decelerates, will tend to restrict the rollers 86 within the taper of recess 79. As pointed out in the description of the first embodiment, large frictional restraints between the rollers 86 and the rod 85 and the housing 78, will arise to prevent forward motion of said sleeve. Consequently, the propellent grains 12 are held upon the rear seat of the rocket casing and shifting of said grains with possible damage thereto is prevented.

Access may be had, through the open outer end of the lateral bore 83, for resetting the set back arming mechanism after the pre-flight testing of this embodiment of the brake unit.

Obviously many modifications and variations of the present invention are possible in the light of the above teachings. It is therefore to be understood that within the scope of the appended claims the invention may be practiced otherwise than as specifically described.

What is claimed is:

1. A braking unit for preventing movement of propellent grains in a rocket casing, said braking unit being supported at one end of said casing and being arranged to engage said propellent grains to restrain movement thereof, said braking unit consisting of a housing having one end thereof in engagement with said propellent grains, with its other end having a recess enlarged at one end and tapering inwardly from said enlarged end, an inner member having one end fixed to said casing and the other end slidable in the recess, wedging means disposed in the recess between said housing and said inner member to restrict relative movement of said inner member and said housing, and detent means engaging said inner member and housing and normally preventing relative movement of said inner member and said housing, said detent means being releasable by inertial forces upon launching of the rocket.

2. An arrangement as set forth in claim 1, and spring means disposed within said recess to urge said wedging means into engagement with said housing and inner member to restrict relative movement of said housing and inner member in one direction.

3. An arrangement as set forth in claim 1, wherein said wedging means consists of ball bearings.

4. An arrangement as set forth in claim 1, wherein said wedging means consists of roller bearings.

5. An arrangement as set forth in claim 1, wherein the recess is circular in cross-section, the inner member is a cylindrical sleeve, and the wedging means consists of ball bearings.

6. An arrangement as set forth in claim 1, wherein said recess is rectangular in cross-section, the inner member is of rectangular cross-section, and said wedging means consists of roller bearings.

7. In a rocket missile having a casing and propellent grains in the casing, a braking apparatus for preventing the shifting of said propellent grains, said apparatus comprising an immovable plate mounted in the forward end of the casing, a movable plate supported between said immovable plate and the propellent grains, spring means urging said movable plate into engagement with the propellent grains, and a plurality of braking units including locking means mounted on said immovable plate and adapted to engage said movable plate and to maintain it in operating position to prevent sudden forward movement of the movable plate and propellent grains.

8. In a rocket missile having a casing with propellent grains therein, a braking apparatus for preventing the shifting of said propellent grains, comprising a plate mounted in the forward end of the casing, and a plurality of braking units supported by said plate, said braking units being arranged to engage said propellent grains for restraining the forward movement of said propellent grains, each of said braking units including a housing having a recess enlarged at its forward end and tapering inwardly from said enlarged end, an inner member fixed to said plate, said member being disposed in said recess, and wedging means disposed in said recess between said inner member and said housing to prevent movement of said housing relative to said inner member and restrain movement of the propellent grains.

9. In a rocket missile having a casing with propellent grains therein, a braking apparatus for preventing the shifting of said propellent grains, comprising an immovable plate mounted in the forward end of the casing, a movable plate supported between said immovable plate and the propellent grains, spring means urging said movable plate into engagement with the propellent grains, and braking units supported by said immovable plate for engagement with said movable plate to prevent forward movement of said movable plate, each of said braking units including a housing having a recess enlarged at its forward end and tapering inwardly from said enlarged end, an inner member fixed to said immovable plate, said member being slidable in said recess, and wedging means disposed in said recess between the inner member and said housing to prevent relative movement of said housing and inner member.

10. An arrangement as set forth in claim 9, wherein each braking unit additionally includes detent means engaging said inner member and housing for normally preventing relative movement of said inner member and housing, said detent means being releasable by inertial influences upon launching of the rocket.

11. An arrangement as set forth in claim 9, wherein each braking unit includes spring means disposed in the recess to urge the wedging means into engagement with the inner member and said housing.

12. In a rocket missile having a casing with propellent grains therein, a braking apparatus for preventing the shifting of said propellent grains, comprising an immovable plate mounted in the forward end of the casing, a movable plate supported between said immovable plate and the propellent grains, spring means urging said movable plate into engagement with the propellent grains, and braking units supported by said immovable plate for engagement with said movable plate to prevent the forward movement of said movable plate, each of said braking units including a housing having an axial passage passing therethrough and an axial recess at its forward end, said recess tapering inwardly, a cylindrical member fixed to said immovable plate and slidable in said passage, and ball bearings disposed in said recess between said housing and said member to prevent relative movement of said housing and member.

13. In a rocket missile having a casing with propellent grains therein, a braking apparatus for preventing the shifting of said propellent grains, comprising an immovable plate mounted in the forward end of the casing, a movable plate supported between said immovable plate and the propellent grains, spring means urging said movable plate into engagement with the propellent grains, and braking units supported by said immovable plate for engagement with said movable plate to prevent the forward movement of said movable plate, each of said braking units including a housing having a cylindrical passage therein, said passage being enlarged to define an axial recess and said recess being tapered inwardly, a cylindrical sleeve fixed to said immovable plate and slidable in the passage, set back arming means mounted in said sleeve and adapted to engage said housing to normally prevent relative movement of said housing and sleeve, said arming means being releasable from said housing by inertial forces upon launching of said missile, and ball bearings disposed in said recess between said housing and sleeve to prevent relative movement of said housing and sleeve after release of said arming means.

14. In a rocket missile having a casing with propellent grains therein, a braking apparatus for preventing the shifting of said propellent grains, comprising an immovable plate mounted in the forward end of the casing, a movable plate supported between said immovable plate and the propellent grains, spring means urging said movable plate into engagement with the propellent grains, and braking units supported by said immovable plate for engagement with said movable plate to prevent the forward movement of said movable plate, each of said braking units including a housing having an inwardly tapering recess at its forward end and a rectangular passage extending from the bottom of said recess through said housing, a rod of rectangular cross-section fixed to said immovable plate and extending into said recess and said passage, and rollers disposed in said recess between said rod and housing to prevent relative movement of said housing and rod.

15. In a rocket missile having a casing with propellent grains therein, a braking apparatus for preventing the shifting of said propellent grains, comprising an immovable plate mounted in the forward end of the casing, a movable plate supported between said immovable plate and the propellent grains, spring means urging said movable plate into engagement with the propellent grains, and braking units supported by said immovable plate for engagement with said movable plate to prevent the forward movement of said movable plate, each of said braking units including a housing having an inwardly tapering recess at its forward end and a rectangular passage extending from the bottom of said cavity through said housing, a rod of rectangular cross-section fixed to said immovable plate and extending into said recess and said passage, arming means mounted in said housing and adapted to engage said rod to prevent relative movement of said housing and rod until such time when said arming means is released as by inertial forces upon launching of said missile, and rollers disposed in said recess between said rod and housing to prevent relative movement of said housing and rod after release of said arming means.

References Cited in the file of this patent

UNITED STATES PATENTS

| 1,363,314 | Cosgrove | Dec. 28, 1920 |
| 1,963,915 | Kennedy et al. | June 19, 1934 |
| 2,421,266 | Honger | May 27, 1947 |

FOREIGN PATENTS

| 1,008,926 | France | Feb. 27, 1952 |